(12) United States Patent
Oliver et al.

(10) Patent No.: US 7,243,217 B1
(45) Date of Patent: Jul. 10, 2007

(54) FLOATING POINT UNIT WITH VARIABLE SPEED EXECUTION PIPELINE AND METHOD OF OPERATION

(75) Inventors: David S. Oliver, Longmont, CO (US); Willard S. Briggs, Boulder, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 498 days.

(21) Appl. No.: 10/254,084

(22) Filed: Sep. 24, 2002

(51) Int. Cl.
*G06F 9/38* (2006.01)
*G06F 9/52* (2006.01)

(52) U.S. Cl. .................................................. 712/222
(58) Field of Classification Search ................ 712/222; 713/501, 322
See application file for complete search history.

(56) References Cited

U.S. PATENT DOCUMENTS

| | | | | |
|---|---|---|---|---|
| 4,288,860 A | * | 9/1981 | Trost | 711/167 |
| 4,841,476 A | * | 6/1989 | Mitchell et al. | 703/26 |
| 4,991,130 A | | 2/1991 | Kojima | |
| 5,134,693 A | | 7/1992 | Saini | |
| 5,539,681 A | * | 7/1996 | Alexander et al. | 713/321 |
| 5,740,410 A | * | 4/1998 | McDermott | 713/501 |
| 5,798,918 A | * | 8/1998 | Georgiou et al. | 700/28 |
| 5,815,693 A | * | 9/1998 | McDermott et al. | 713/501 |
| 5,913,923 A | * | 6/1999 | Dunlap et al. | 710/100 |
| 5,964,884 A | * | 10/1999 | Partovi et al. | 713/503 |
| 5,987,620 A | * | 11/1999 | Tran | 713/600 |
| 5,996,083 A | * | 11/1999 | Gupta et al. | 713/322 |
| 6,035,315 A | * | 3/2000 | Krick | 708/490 |
| 6,047,248 A | * | 4/2000 | Georgiou et al. | 702/132 |
| 6,049,882 A | * | 4/2000 | Paver | 713/322 |
| 6,065,126 A | * | 5/2000 | Tran et al. | 713/401 |
| 6,112,296 A | | 8/2000 | Witt et al. | |
| 6,122,721 A | | 9/2000 | Goddard et al. | |
| 6,219,723 B1 | * | 4/2001 | Hetherington et al. | 710/18 |
| 6,460,125 B2 | * | 10/2002 | Lee et al. | 711/167 |
| 6,487,653 B1 | | 11/2002 | Oberman et al. | |
| 6,647,502 B1 | * | 11/2003 | Ohmori | 713/322 |
| 6,714,957 B1 | | 3/2004 | Lohman | |
| 6,715,089 B2 | * | 3/2004 | Zdravkovic | 713/322 |
| 6,732,134 B1 | | 5/2004 | Rosenberg et al. | |
| 6,801,924 B1 | | 10/2004 | Green et al. | |
| 6,826,704 B1 | | 11/2004 | Pickett | |
| 6,859,886 B1 | * | 2/2005 | Johnson | 713/600 |
| 6,938,176 B1 | * | 8/2005 | Alben et al. | 713/323 |
| 6,983,389 B1 | * | 1/2006 | Filippo | 713/324 |

FOREIGN PATENT DOCUMENTS

EP 0032818 A2 * 7/1981

OTHER PUBLICATIONS

Novak, J H et al. "Using FPGAs to Prototype a Self-Timed Floating Point Co-Processor" IEEE 1994 Custom Integrated Circuits Conference.*

* cited by examiner

*Primary Examiner*—Eric Coleman

(57) ABSTRACT

A variable speed floating point unit comprising: 1) an execution pipeline comprising a plurality of execution stages capable of executing floating point operations in a series of sequential steps; and 2) a clock controller capable of receiving an input clock signal and generating a variable speed output clock signal capable of clocking the execution pipeline. The clock controller adjusts a speed of the variable speed output clock signal according to a level of queued opcodes waiting to be executed in the execution pipeline.

26 Claims, 4 Drawing Sheets

FLOATING POINT UNIT WITH VARIABLE SPEED EXECUTION PIPELINE AND METHOD OF OPERATION

CROSS-REFERENCE TO RELATED APPLICATION

The present invention is related to that disclosed and claimed in the following U.S. patent application Ser. No. 10/254,022, filed concurrently herewith, entitled "FLOATING POINT UNIT WITH TRY-AGAIN RESERVATION STATION AND METHOD OF OPERATION." The related application is commonly assigned to the assignee of the present invention. The disclosures of the related patent application is hereby incorporated by reference for all purposes as if fully set forth herein.

TECHNICAL FIELD OF THE INVENTION

The present invention is generally directed to data processors, and more specifically, to a floating point unit (FPU) containing a variable speed execution pipeline.

BACKGROUND OF THE INVENTION

The demand for ever-faster computers requires that state-of-the-art microprocessors execute instructions in the minimum amount of time. Microprocessor speeds have been increased in a number of different ways, including increasing the speed of the clock that drives the processor, reducing the number of clock cycles required to perform a given instruction, implementing pipeline architectures, and increasing the efficiency at which internal operations are performed. This last approach usually involves reducing the number of steps required to perform an internal operation.

Efficiency is particularly important in mathematical calculations, particularly floating point calculations that are performed by a data coprocessor. The relative throughput of a processor (i.e., integer unit pipeline) that drives a coprocessor (i.e., floating point unit pipeline) may change drastically depending on the program being executed. If the floating point unit is built fast enough to handle the high-end throughput of the integer unit pipeline, then idle instructions (or "bubbles") that cause no change in status may be inserted into the floating point unit pipeline during periods when the integer unit is supplying data and instructions to the floating point unit at the low-end rate.

Unfortunately, the bubble instructions cause circuitry to be clocked in the stages of the execution pipeline without doing any useful work, thereby wasting power. This is particularly damaging to the performance of portable devices that operate from a battery, because the wasted power reduces battery life. However, if the floating point unit is slowed down to match the low-end throughput of the integer unit, then the execution pipeline of the floating point unit cannot keep up with the high-end throughput rate of the integer unit pipeline, thereby stalling the processing system.

Therefore, there is a need in the art for an improved data processor that executes mathematical operations more rapidly. In particular, there is a need for an improved floating point unit that executes floating point instructions as rapidly as possible, with minimum power consumption. More particularly, there is a need in the art for a floating point unit that can operate at the high-end throughput rate of the integer unit pipeline without requiring the use of bubble instructions during periods when the integer unit pipeline is driving the floating point unit at the low-end throughput rate of the integer unit pipeline.

SUMMARY OF THE INVENTION

To address the above-discussed deficiencies of the prior art, it is a primary object of the present invention to provide a variable speed floating point unit. According to an advantageous embodiment of the present invention, the variable speed floating point unit comprises: 1) an execution pipeline comprising a plurality of execution stages capable of executing floating point operations in a series of sequential steps; and 2) a clock controller capable of receiving an input clock signal and generating a variable speed output clock signal capable of clocking the execution pipeline.

According to one embodiment of the present invention, the clock controller adjusts a speed of the variable speed output clock signal according to a level of queued opcodes waiting to be executed in the execution pipeline.

According to another embodiment of the present invention, the floating point unit comprises a dispatch unit capable of loading the queued opcodes into the execution pipeline.

According to still another embodiment of the present invention, the dispatch unit comprises a plurality of reservation stations capable of buffering the queued opcodes.

According to yet another embodiment of the present invention, the clock controller monitors at least one level of queued opcodes buffered in at least one of the plurality of reservation stations.

According to a further embodiment of the present invention, the clock controller adjusts the speed of the variable speed output clock signal according to the at least one level of queued opcodes buffered in the at least one reservation station.

According to a still further embodiment of the present invention, the clock controller adjusts the speed of the variable speed output clock signal according to a type of a first queued opcode waiting to be executed in the execution pipeline.

According to a yet further embodiment of the present invention, the first queued opcode type indicates that an integer unit associated with the floating point unit is waiting for a result from the floating point unit.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor.

Figure 1:
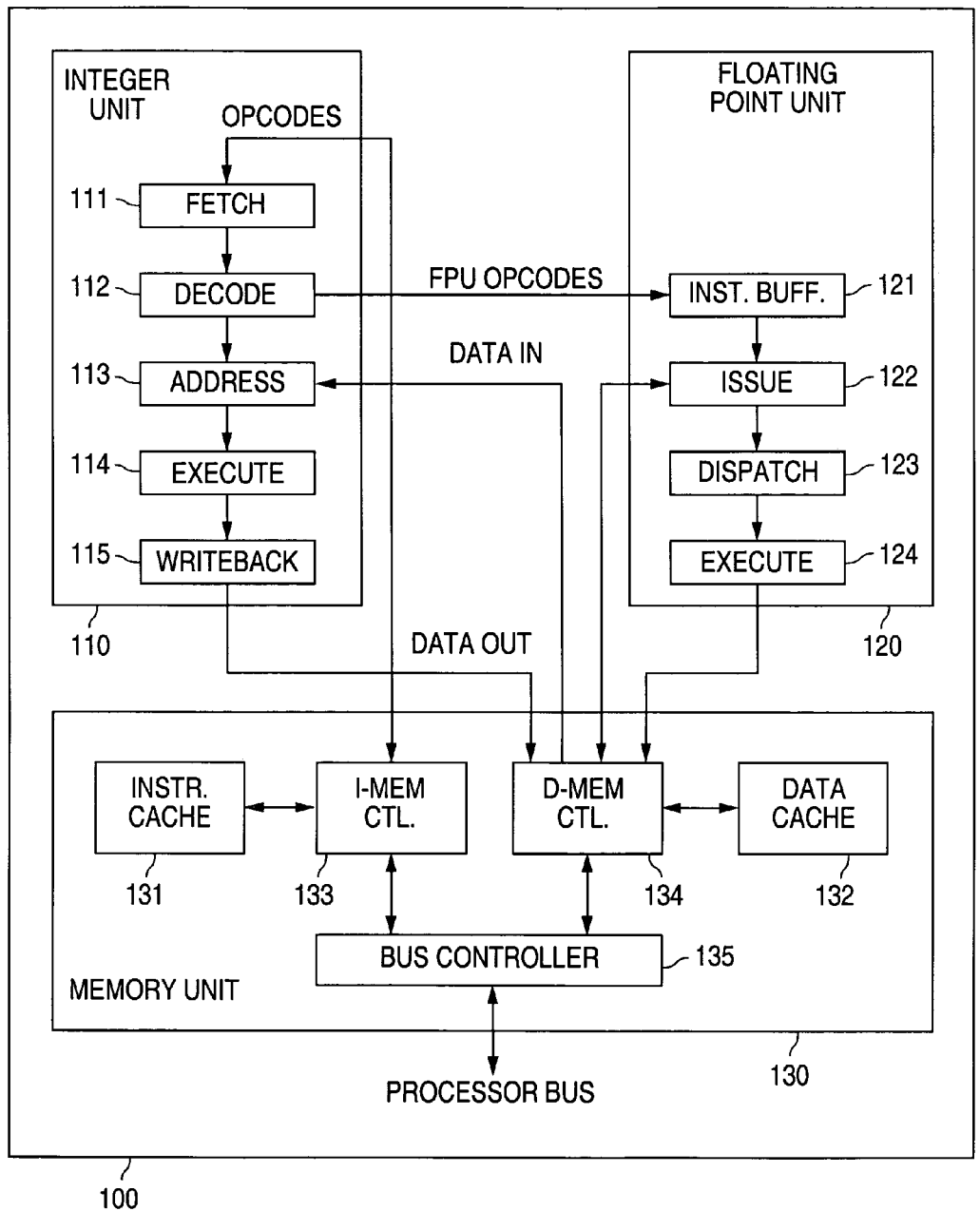
FIG. 1 illustrates an exemplary data processor in which a variable speed floating point unit according to the principles of the present invention is implemented.

FIG. 1 illustrates exemplary data processor 100 in which variable speed floating point unit 120 according to the principles of the present invention is implemented. Data processor 100 comprises integer unit (IU) 110, floating point unit (FPU) 120, and memory unit (MU) 130. Integer unit 110 comprises instruction fetch unit 111, instruction decode unit 112, address translation unit 113, integer execution pipeline 114, and writeback unit 115. Floating point unit (FPU) 120 comprises instruction buffer 121, issue unit 122, dispatch unit 123, and floating point unit (FPU) execution pipeline 124. Memory unit 130 comprises instruction cache 131, data cache 132, instruction memory controller 133, data memory controller 134, and bus controller 135.

Instruction memory controller 133 fetches instructions from instruction cache (I-cache) 131. In case of a miss in instruction cache 131, instruction memory controller 133 retrieves the missed instruction from main memory (not shown) via bus controller 125 and the processor bus (not shown). Instruction memory controller 133 then stores the retrieved instruction in instruction cache 131. Similarly, data memory controller 134 fetches data operands (DATA IN) from data cache (D-cache) 132. In case of a miss in data cache 132, data memory controller 134 retrieves the missed data operand from main memory (not shown) via bus controller 125 and the processor bus (not shown). Data memory controller 134 then stores the retrieved data in data cache 132.

During routine operation, instruction memory controller 133 fetches instructions from instruction cache 131 and loads the instructions (i.e., opcodes) into fetch unit 111 in integer unit 110. Fetch unit 111 forwards the fetched opcodes to instruction decode unit 112 for decoding. Decoding unit 112 forwards decoded integer instruction opcodes to address translation unit 113 in integer unit 110. Address translation unit 113 calculates the correct address of the data operand and retrieves the required operand from data cache 132 via data memory controller 134.

Address translation unit 113 then forwards the integer instruction opcodes and the data operands to integer execution pipeline 114. After execution of the integer instruction by integer execution pipeline 114, writeback unit 115 writes the result to an internal register array (not shown) of integer unit 110, or to data cache 132 (via data memory controller 134), or to both.

Decoding unit 112 forwards decoded floating point unit instructions (i.e., FPU opcodes) to instruction buffer 121 in floating point unit 120. Issue unit 122 reads the decoded FPU opcodes from instruction buffer 121 and retrieves the required operand from data cache 132 via data memory controller 134. Issue unit 122 then forwards the FPU instruction opcodes and the data operands to dispatch unit 123.

Dispatch unit 123 stores the opcodes and operands in a plurality of reservation stations (not shown) and subsequently transfers opcodes and operands to FPU execution pipeline 124 at appropriate times. After execution of the FPU opcodes by FPU execution pipeline 124, a writeback unit (not shown) in FPU execution pipeline 124 writes the result to an internal register array (not shown) of floating point unit 120 or to data cache 132 (via data memory controller 134).

The architecture of data processor 100 illustrated and described above with respect to FIG. 1 is well known to those skilled in the art. It should be noted that this conventional architecture is merely illustrative of one type of data processor in which a variable speed FPU according to the principles of the present invention may be embodied. Those skilled in the art will readily understand that a variable speed FPU according to the principles of the present invention may easily be implemented in many other types of data processor architectures. Therefore, the descriptions of the variable speed FPU contained herein should not be construed so as to limit the scope of the present invention.

Figure 2:
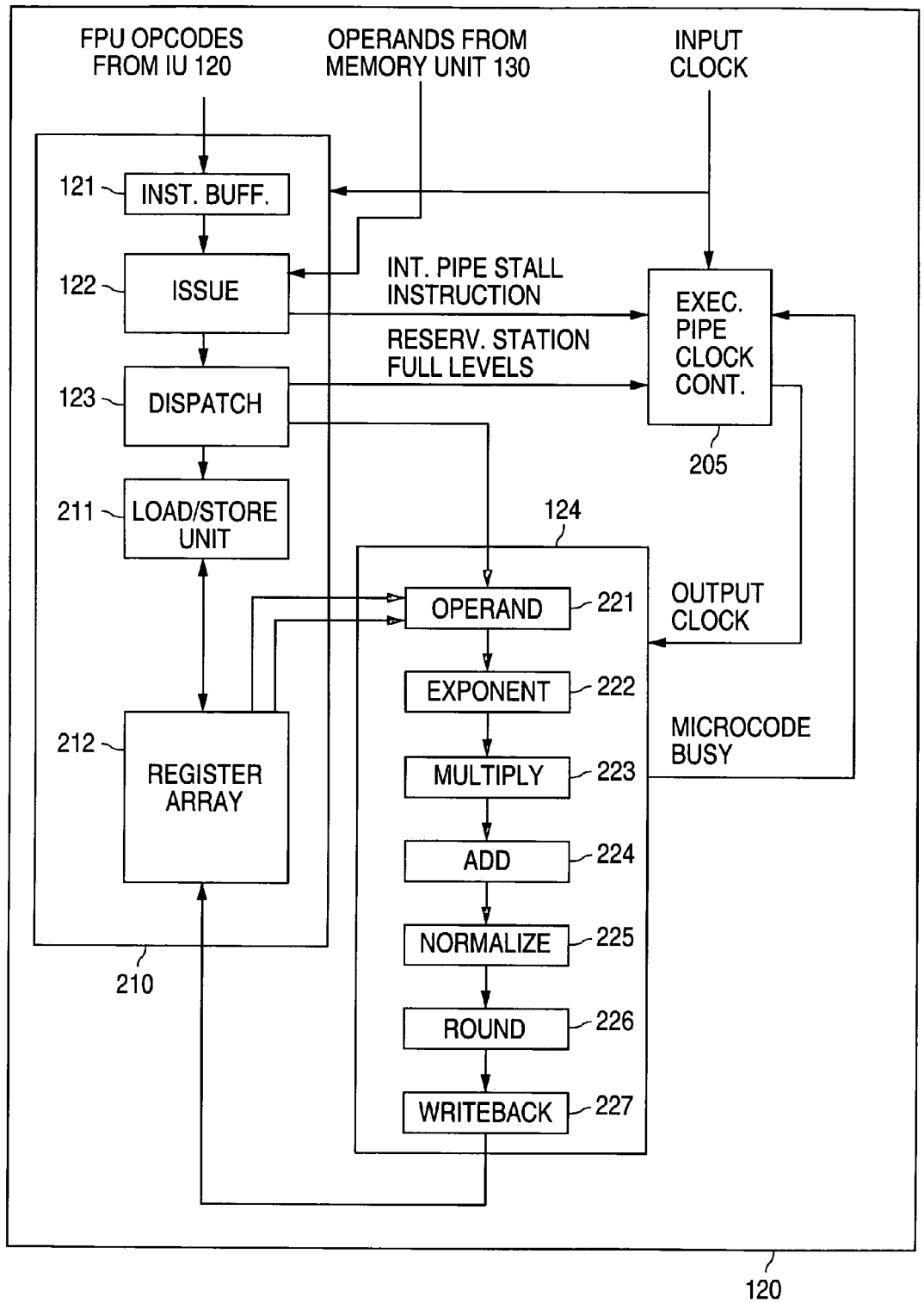
FIG. 2 illustrates the variable speed floating point unit in FIG. 1 in greater detail according to one embodiment of the present invention.

FIG. 2 illustrates variable speed floating point unit 120 in greater detail according to one embodiment of the present invention. Circuit block 210 generally designates components of floating point unit 120 that operate at the full speed of the Input Clock signal. These components include instruction buffer 121, issue unit 122, dispatch unit 123, load/store unit 211, and register array 212. However, the clock speed of floating point unit (FPU) execution pipeline 124 is variable and is controlled by execution pipeline clock controller 205. The Output Clock signal from execution pipeline clock controller 205 is a variable percentage (up to 100%) of the Input Clock signal.

FPU execution pipeline 124 comprises operand stage 221, which retrieves operands from register array 212 and receives FPU opcodes and operands from dispatch unit 123. FPU execution pipeline 124 further comprises exponent align stage 222, multiply stage 223, add stage 224, normalize stage 225, and round stage 226. Finally, FPU execution pipeline 124 comprises writeback stage 227, which writes results back to register array 212 or to data cache 132.

The architecture of FPU execution pipeline 124 illustrated and described above with respect to FIG. 2 is well known to those skilled in the art and need not be discussed in greater detail. This conventional architecture is merely illustrative of one exemplary type of FPU execution pipeline which may be clocked at variable speeds according to the principles of the present invention. The descriptions herein of variable speed FPU execution pipeline 124 should not be construed so as to limit the scope of the present invention.

The present invention decouples the clock speed of integer unit 110 and FPU 120 using command and data queues (or reservation stations) in dispatch unit 123 and control logic in execution pipeline clock controller 205. Execution pipeline clock controller 205 set the clock speed of FPU execution pipeline 124 as a function of the number and type of commands in the reservation stations in dispatch unit 123. This information is determined from Reservation Station Full Levels status signals received from dispatch unit 123 and an Integer Pipe Stall Instruction signal received from issue unit 122.

Execution pipeline clock controller 205 sets the speed of the Output Clock signal to a high rate (Fast mode) if the reservation stations are filling up, if integer unit 110 is stalled waiting for a result from FPU 120, or if the commands in the reservation stations require multiple cycles to execute. However, if the reservation stations are relatively low, then execution pipeline clock controller 205 sets the speed of the Output Clock signal to a slower clock speed (Slow mode) or to one of a plurality of slower clock speeds (variable rate) in order to save power. If the reservation stations and execution pipeline 124 are empty, then execution pipeline clock controller 205 may stop the Output Clock signal completely (Sleep mode) to save additional power.

Figure 3:
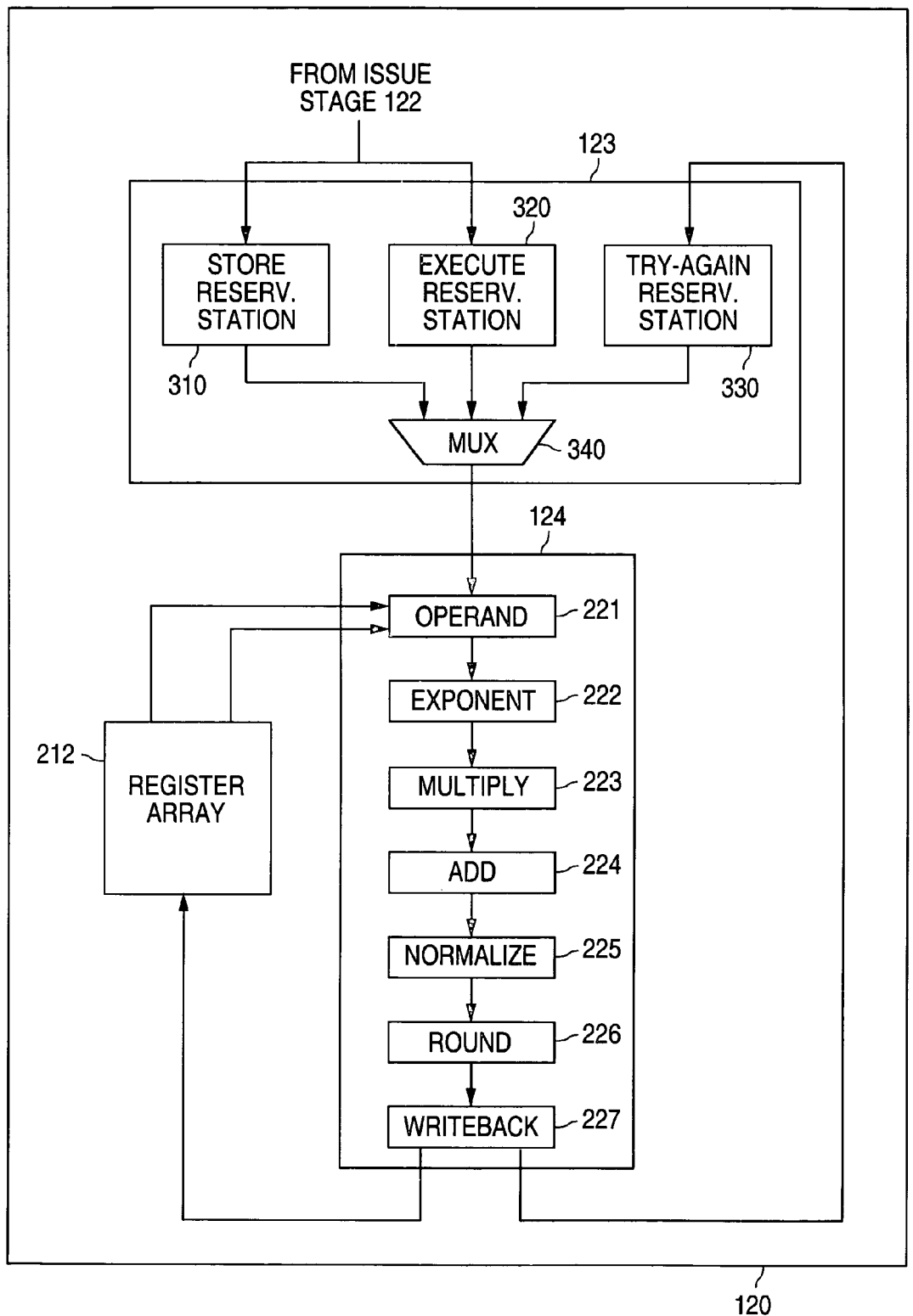
FIG. 3 illustrates the dispatch unit of the variable speed floating point unit according to one embodiment of the present invention.

FIG. 3 illustrates dispatch unit 123 of variable speed floating point unit (FPR) 120 according to one embodiment of the present invention. Dispatch unit 123 comprises a plurality of command and data queues that transfer opcodes and operands into FPU execution pipeline 124 via multiplexer (MUX) 340. These command and data queues include exemplary store reservation station 310, execute reservation station 320, and try-again reservation station 330, among others. Execution pipeline clock controller 205 determines the levels of opcodes and operands in store reservation station 310, execute reservation station 320, and try-again reservation station 330 and increases the clock speed to prevent stalls if the levels rise close to full levels. Execution pipeline clock controller 205 also increases clock speed if any opcode indicates that integer unit 110 is waiting for a result from FPU 120.

Figure 4:
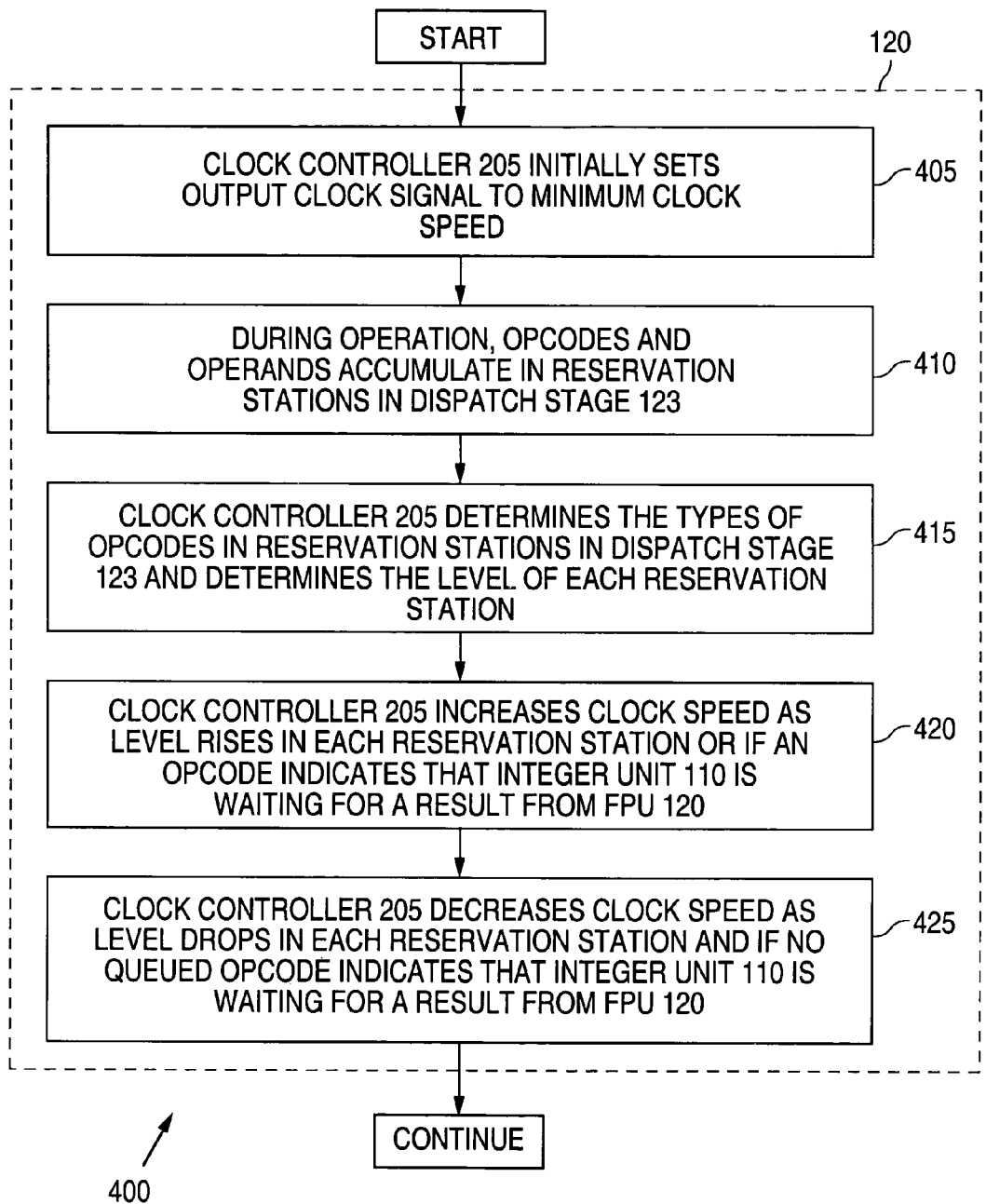
FIG. 4 is a flow chart illustrating the operation of the variable speed floating point unit according to one embodiment of the present invention.

FIG. 4 depicts flow chart 400, which illustrates the operation of variable speed floating point unit 120 according to one embodiment of the present invention. Initially, execution pipeline clock controller 205 sets the Output Clock signal to a minimum clock speed threshold level in order to minimize power consumption (process step 405). During operation, opcodes and operands accumulate in the reservation stations in dispatch stage 123 (process step 410). Execution pipeline clock controller 205 continually determines the types of opcodes in the reservation stations in dispatch stage 123 and also determines the level of each reservation station (process step 415).

Execution pipeline clock controller 205 increases the Output Clock signal speed as the level rises in each reservation station or if an opcode indicates that integer unit 110 is waiting for a result from FPU 120 (process step 420). Execution pipeline clock controller 205 also decreases the Output Clock signal speed as the level drops in each reservation station and if no queued opcode indicates that integer unit 110 is waiting for a result from FPU 120 (process step 425).

Although the present invention has been described with several embodiments, various changes and modifications may be suggested to one skilled in the art. It is intended that the present invention encompass such changes and modifications as fall within the scope of the appended claims.

What is claimed is:

1. A floating point unit comprising:
an execution pipeline comprising a plurality of execution stages capable of executing floating point operations in a series of sequential steps; and
a clock controller capable of receiving an input clock signal and generating a variable speed output clock signal capable of clocking said execution pipeline according to a type of a first queued opcode waiting to be executed in said execution pipeline, wherein said first queued opcode type indicates that an integer unit associated with said floating point unit is waiting for a result from said floating point unit.

2. A method comprising:
providing a first clock signal to an integer execution pipeline of an integer execution unit of a processing device;
queuing instructions received from the integer execution unit at a floating point execution unit of the processing device;
determining a level of the instructions by a floating point execution pipeline of the floating point execution unit of the processing device;
modifying a frequency of a second clock signal, different than the first clock signal, based on the level of the instructions; and
providing the second clock signal to the floating point execution pipeline.

3. The method of claim 2, wherein a frequency of the first clock signal is substantially constant.

4. The method of claim 3, wherein the second clock signal is based on the first clock signal.

5. The method of claim 2, wherein the second clock signal is based on the first clock signal.

6. The method of claim 2, wherein modifying the frequency of the second clock signal comprises modifying the frequency of the second clock signal substantially in proportion to a fullness of a queue storing instructions for execution by the floating point execution pipeline.

7. The method of claim 2, wherein modifying the frequency of the second clock signal comprises setting the frequency of the second clock signal at substantially zero in response to the level of instructions being zero instructions.

8. The method of claim 2, further comprising:
modifying the frequency of the second clock based on a type of instruction queued for execution by the floating point execution pipeline.

9. The method of claim 2, further comprising:
increasing the frequency of the second clock signal in response to an indication that the integer execution pipeline is waiting for a result from the floating point execution pipeline; and
decreasing the frequency of the second clock signal in response to an indication that the integer execution pipeline is not waiting for a result from the floating point execution pipeline.

10. The method of claim 2, wherein providing the first clock signal to the integer execution pipeline comprises clocking the integer execution pipeline using the first clock signal.

11. The method of claim 10, wherein providing the second clock signal to the floating point execution pipeline comprises clocking the floating point execution pipeline using the second clock signal.

12. The method of claim 2, wherein the processing device comprises a plurality of reservation stations to queue instructions for execution by the floating point execution pipeline, and wherein determining the level of instructions queued for execution by the floating point execution pipeline comprises determining a level of instructions queued in a reservation station of the plurality of reservation stations.

13. The method as set forth in claim 2 wherein the floating point unit comprises a dispatch unit capable of loading the queued opcodes into the execution pipeline and the dispatch unit comprises a plurality of reservation stations capable of buffering the queued opcodes.

14. The method of operating a floating point unit as set forth in claim 13 further comprising monitoring at least one level of queued opcodes buffered in at least one of the plurality of reservation stations.

15. The method of operating a floating point unit as set forth in claim 14 wherein adjusting comprises adjusting the speed of the variable speed output clock signal according to the at least one level of queued opcodes buffered in the at least one reservation station.

16. The method of operating a floating point unit as set forth in claim 13 wherein adjusting comprises adjusting the speed of the variable speed output clock signal according to a type of a first queued opcode waiting to be executed in the execution pipeline.

17. The method of operating a floating point unit as set forth in claim 16 wherein the first queued opcode type indicates that an integer unit associated with the floating point unit is waiting for a result from the floating point unit.

18. A system comprising:
an integer execution unit comprising an integer execution pipeline having an input to receive a first clock signal;
a queue to store floating point instructions received from the integer execution unit;
a clock controller having an output to provide a second clock signal, different than the first clock signal, wherein the clock controller is to modify a frequency of the second clock signal based on a level of floating point instructions in the queue; and
a floating point execution pipeline having an input to receive the second clock signal.

19. The system of claim 18, wherein a frequency of the first clock signal is substantially constant.

20. The system of claim 19, wherein the second clock signal is based on the first clock signal.

21. The system of claim 18, wherein the clock controller is to modify the frequency of the second clock signal substantially in proportion to a fullness of a queue storing instructions for execution by the floating point execution pipeline.

22. The system of claim 18, wherein the clock controller is to modify the frequency of the second clock signal by setting the frequency of the second clock signal at substantially zero in response to the level of instructions being zero.

23. The system of claim 18, wherein the clock controller further is to modify the frequency of the second clock based on a type of instruction queued for execution by the floating point execution pipeline.

24. The system of claim 18, wherein the clock controller further is to:
increase the frequency of the second clock signal in response to an indication that the integer execution pipeline is waiting for a result from the floating point execution pipeline; and
decrease the frequency of the second clock signal in response to an indication that the integer execution pipeline is not waiting for a result from the floating point execution pipeline.

25. The system of claim 18, wherein the integer execution pipeline is clocked using the first clock signal and the floating point execution pipeline is clocked using the second clock signal.

26. The system of claim 18, further comprising:
a plurality of reservation stations to queue instructions for execution by the floating point execution pipeline; and
wherein the queue comprises one of the plurality of reservation stations.

* * * * *